(12) United States Patent
Maurer et al.

(10) Patent No.: US 11,312,568 B1
(45) Date of Patent: Apr. 26, 2022

(54) MEDIALLY STABILIZED LIQUID SURGE SUPPRESSOR

(71) Applicant: Liquid Surge Control, LLC, Dillsburg, PA (US)

(72) Inventors: Gary K. Maurer, Dillsburg, PA (US); Gerald Edward Russell, Henrico, VA (US)

(73) Assignee: Liquid Surge Control LLC, Dillsburg, PA (US)

( * ) Notice: Subject to any disclaimer, the term of this patent is extended or adjusted under 35 U.S.C. 154(b) by 0 days.

(21) Appl. No.: 17/019,209

(22) Filed: Sep. 12, 2020

(51) Int. Cl.
*B65D 90/52* (2006.01)

(52) U.S. Cl.
CPC .................................... *B65D 90/52* (2013.01)

(58) Field of Classification Search
CPC ............ B65D 90/52; B60K 2015/0777; B60K 2015/03111; B60K 2015/0344
See application file for complete search history.

(56) References Cited

U.S. PATENT DOCUMENTS

| 6,945,423 B2 * | 9/2005 | Wilson | B60K 15/077 |
| | | | 137/574 |
| 2004/0134916 A1 * | 7/2004 | Bambacigno | B60P 3/2235 |
| | | | 220/563 |

* cited by examiner

*Primary Examiner* — Stephen J Castellano
(74) *Attorney, Agent, or Firm* — Hooker & Habib, P.C.

(57) ABSTRACT

A medially stabilized surge suppressor has longitudinal members joined together at opposite ends of the members and a medial disk supporting the members. The longitudinal members are fastened to the medial disks by tabs that pass through elongate slots located in the longitudinal members. The longitudinal members each include a number of flow orifices that enable fluid through the flow orifices as well as between the longitudinal members. The end portions of the longitudinal members are joined at each of first and second junctions by a pin and a washer forming a non-rotable connection between them.

16 Claims, 10 Drawing Sheets

MEDIALLY STABILIZED LIQUID SURGE SUPPRESSOR

FIELD OF THE DISCLOSURE

The disclosure relates generally to baffles or the like located within liquid-filled tanks to control surging, and in particular, medially stabilized surge suppressors.

BACKGROUND OF THE DISCLOSURE

Tanker trucks are used throughout the world to transport a variety of liquids, including gasoline, chemicals, and water. When the truck is in motion, however, the liquid in the tank can create problems. For example, when it is necessary to stop, accelerate, or corner the truck, the inertia of the liquid within the tank creates a wave that transmits energy to various portions of the vehicle. This uncontrolled energy transfer can cause the vehicle to become unstable and affect the proper handling of the vehicle. This problem does not solely affect tanker trucks. Any form of transportation used to carry liquid, such as a rail car, a ship, or an airplane, can be subject to the same instability when in transit.

In addition to creating instability, sloshing of the liquid in the tank can cause stress to the inside of the tank. In particular, the uncontrolled liquid in the tank can wear down the walls and joints of the tank, thus reducing the tank's useful life. Furthermore, deterioration of the tank can result in dangerous leaks or spills.

Wilson U.S. Pat. No. 6,945,423, owned by the applicant and incorporated by reference as if fully set forth herein, discloses as illustrated in FIG. 15 a medially stabilized surge suppressor S formed from three flexible, elongate longitudinal members M, and a generally annular medial disk D attached to intermediate portions of the longitudinal members M that stabilizes and separates the members. First ends of the longitudinal members M are joined together at a first junction J1 and opposite second ends of the longitudinal members are joined together at a second junction J2 spaced along a suppressor axis A using like pins P that extend through fastener openings present in opposite first and second ends of each longitudinal member.

A generally planar clip C shown in FIG. 16 can also be snapped onto each pin. The clip assists in retaining the longitudinal members on the pin and resists the longitudinal members slipping off the pin during use of the surge suppressor.

The longitudinal members M pass through respective slotted locks formed in the medial disk D. Adjacent each lock is a retainer that defines an abrupt shoulder on a side opposite the locking slot. During assembly the longitudinal members are snapped over their retainers. The retainer holds its longitudinal member at an oblique angle with respect to the longitudinal axis defined by the pair of pins. The obliquity enables the longitudinal members to induce eddying of the fluid within the surge suppressor, diffusing and dissipating surges in the fluid passing through the surge suppressor.

The Wilson surge suppressor has proven very effective in application over about 15 years, with hundreds of thousands of surge suppressors being used to resist, diffuse, and suppress surge in many thousands of tanker trucks.

Nevertheless, there is always a need to improve the ease of assembly and the functioning of a medially stabilized surge suppressor.

SUMMARY OF THE DISCLOSURE

Disclosed is a surge suppressor of the type formed from flexible, elongate longitudinal members and a generally annular shaped medial disk attached to intermediate portions of the longitudinal members.

The surge suppressor in accordance with the present disclosure will be similar to the surge suppressor S shown in FIG. 15 but will include: (i) modified attachment structures formed as tabs and slots that fasten the longitudinal member to the medial disk, (ii) one or more of the longitudinal member M including a number of spaced apart flow orifices that, when the surge suppressor is submerged in a fluid, enables fluid flow through the longitudinal member flow orifices members as well as between the longitudinal members, and (iii) fastening washers that form non-rotatable connections with the pins joining the ends of the longitudinal members and provide a visual indication that the fastening washer is properly positioned on the pin.

In possible embodiments, the medial disk includes tabs spaced around the outer periphery of the medial disk body. A tab is joined to the body by a reduced width neck. A longitudinal member includes an elongate slot sized to receive the tab and a hole in the slot that rotatably receives the neck, permitting the member to receive the tab and rotate about the neck to secure and align the longitudinal member with the medial disk.

In other possible embodiments, the flow orifices of a longitudinal member can have different orientations or sizes. A flow orifice can, for example, be teardrop shaped to discharge curved fluid flow from the flow orifice that can increase eddy formation when a surge passes through the surge suppressor.

The fastening washer may include a second indention that enables rotation of the fastening washer about the fastening pin.

The disclosed improvements to the surge suppressor have a number of advantages.

The tab/slot attachment mechanism is more convenient and enables quicker assembly than does snapping the longitudinal members over retainers. The flow orifices enable the designer to generate improved eddy flow and turbulence of the fluid passing through the surge suppressor for more efficient damping of a surge. The fastening pins being received in indentations of the fastening washer enable visual confirmation that the fastening washer is connected to the fastener pin at assembly.

Other objects and features of the disclosure will become apparent as the description proceeds, especially when taken in conjunction with the accompanying drawing sheets illustrating one or more illustrative embodiments.

DETAILED DESCRIPTION

The assembled surge suppressor in accordance with the present disclosure will be similar to the surge suppressor S shown in FIG. 15 but will include, as will be described in more detail below: (i) modified attachment structures that fasten the longitudinal members M to the medial disk D, (ii) one or more of the longitudinal member M including a number of spaced apart flow orifices that, when the surge suppressor is submerged in a fluid, enables fluid flow through the longitudinal member flow orifices as well as between the longitudinal members, and (iii) fastening washers that form non-rotatable connections with the pins joining the ends of the longitudinal members and provide a visual indication that the fastening washer is properly positioned on the pin.

Figure 1:
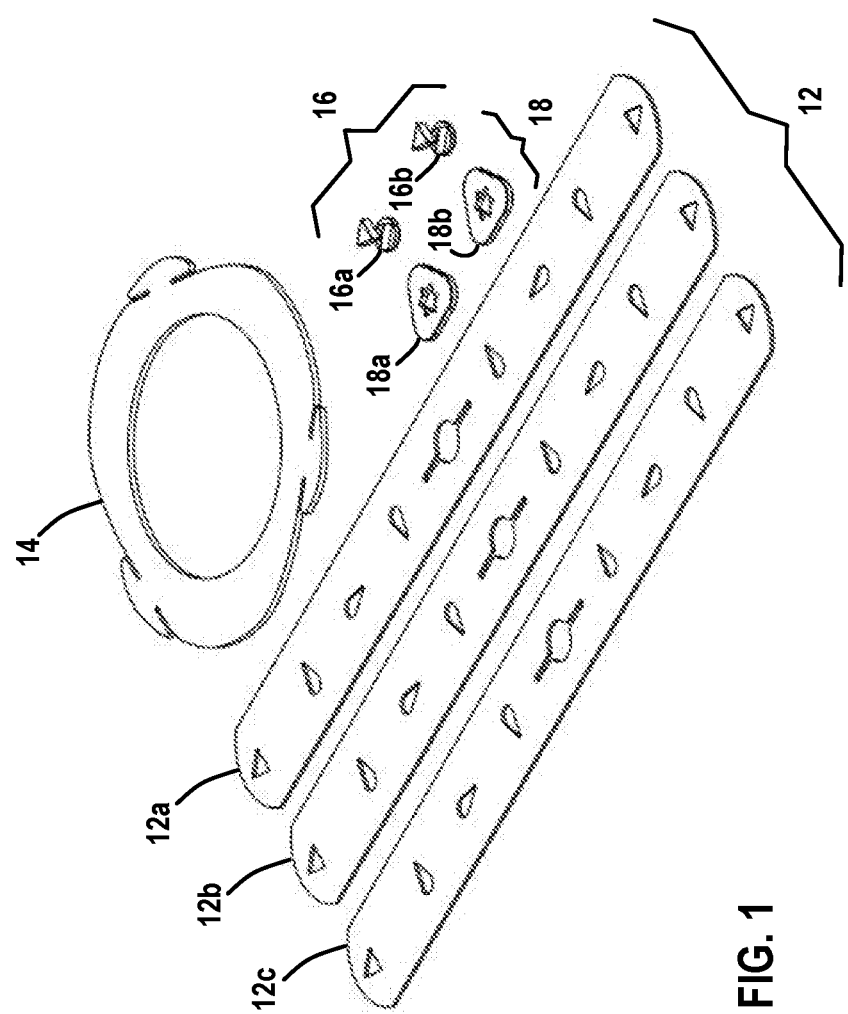
FIG. 1 illustrates the components of a surge suppressor in accordance with this disclosure.

FIG. 1 illustrates the component parts of an embodiment of a surge suppressor in accordance with this disclosure. A surge suppressor can be provided in kit form for compact shipment and storage in which the component parts are provided for assembly of the surge suppressor by a user, or the surge suppressor can be provided pre-assembled for immediate use.

The component parts include three like longitudinal members including member 12a, member 12b, and member 12c, a medial disk 14, a pair of like fastening pins 16 including fastening pin 16a and fastening pin 16b, and a pair of like fastening washers 18 including fastening washer 18a and fastening washer 18b.

Each longitudinal member 12 is relatively flexible and resilient, both along its length as well as through the thickness of the member. The medial disk 14 may be relatively stiff as compared to the longitudinal members.

Figure 2:
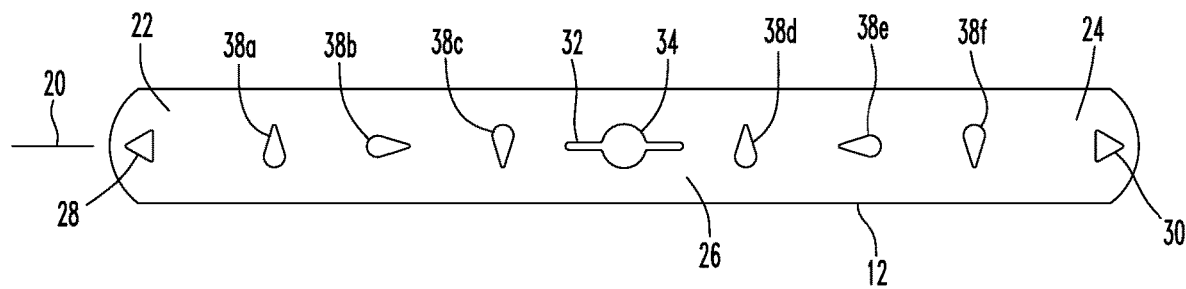
FIG. 2 illustrates a longitudinal member being one of the components shown in FIG. 1.

A longitudinal member 12 as shown in FIG. 2 extends along a longitudinal axis 20 and includes a first end 22, an opposite second end 24, and an intermediate portion 26 disposed between the first and second ends. Disposed in the first end 22 is a substantially equilateral triangle-shaped first fastener opening 28. Disposed in the second end 22 is a like substantially equilateral triangle-shaped second fastener opening 30.

Figure 3:
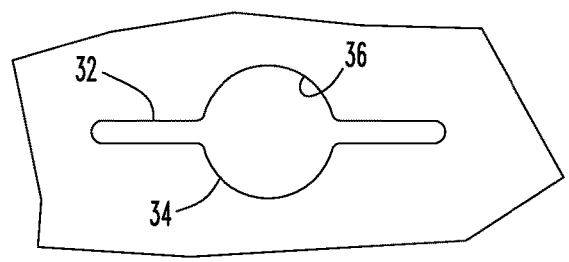
FIG. 3 is an enlarged view of a slot and hole formed in the longitudinal member shown in FIG. 2.

Disposed in the intermediate portion 26 of longitudinal member 12 is an elongate, generally longitudinal through-slot 32 extending along the longitudinal axis, shown enlarged in FIG. 3. In this embodiment the through-slot is centered between the ends of the longitudinal member. Disposed on the through-slot 32 is a substantially round hole 34. By "substantially round" is meant the hole 34 is defined and surrounded by a wall 36 that, except where intercepted by the slot 32 surrounds and is spaced from a central portion of the opening. The illustrated hole 34 is surrounded by a circular wall but other wall shapes, including polygonal walls, curved walls, and walls with mixed curved and straight portions are possible in other embodiments.

The through slot 32 and the hole 34 cooperate with the medial disk 14 to attach the longitudinal member to the medial disk as will be described in more detail below.

Figure 4:
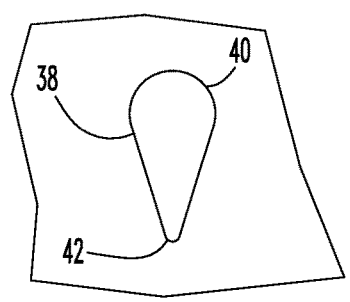
FIG. 4 is an enlarged view of a flow orifice formed in the longitudinal member shown in FIG. 2.

Each longitudinal member 12 further includes a number of longitudinally spaced apart like flow orifices 38a-38f (FIG. 4 is an enlarged view of a flow orifice 38). The flow orifices enable fluid to flow through the longitudinal member 12 when the surge suppressor is submerged in a fluid in addition to the fluid flowing between the longitudinal members. In the illustrated embodiment the longitudinal member includes a set of three flow orifices 38a, 38b, 38c longitudinally distributed between the first fastener opening 28 and the longitudinal slot 32 and a second set of three flow orifices 38d, 38e, 38f longitudinally distributed between the second fastener opening 30 and the longitudinal slot 32.

FIG. 4 is an enlarged view of a flow orifice 38. In the illustrated embodiment a flow orifice 38 has an overall triangular shape that has a curved side 40 opposite a rounded vertex 42 of the triangle. The curved side and rounded vertex form a generally teardrop-shaped flow orifice. The planar cross-sectional width of the flow orifice decreases in the direction from the curved side 40 towards the vertex 42 whereby the flow rate of fluid passing through the flow orifice would generally decrease from the curved side towards the rounded vertex, with a greater flow at the curved end and a lesser, reduced flow at the vertex end. This variation in rate of flow produces a curved flow of fluid discharged from the flow orifice that generates additional eddies in the fluid. These additional eddies would redirect and oppose a surge passing through the surge suppressor.

As shown in FIG. 2, although each flow orifice 38 has the same shape, the orientation of the flow orifice with respect to the longitudinal axis 20 can vary among the flow orifices. For example, flow orifices 38a, 38c, 38d, and 38f are oriented with the curved side and the vertex of the flow orifice on opposite sides of the longitudinal axis and so extend transverse to the longitudinal axis, while the flow orifices 38a, 38d are "flipped" and have their rounded vertices on the same side of the longitudinal axis as the curved sides of the orifices 36c, 36f. The orifices 38b, 38e on the other hand extend along the longitudinal axis but point in opposite directions, with the vertex of the orifice 38b pointing towards the second fastener opening 30 and the vertex of the orifice 38e pointing towards the first fastener opening 28.

By varying the orientation of the flow orifices, the curved fluid flow through the orifices do not parallel one another and can collide and intermix to assist in generating eddies within the fluid passing through and past the surge suppressor. In other surge suppressor embodiments, less than all of the longitudinal members may include flow orifices, and the number, size, shape, orientation, and distribution of the flow orifices along the member may vary among the longitudinal members. Flow orifices that do not change the direction of flow of fluid passing through the flow orifice may also be provided.

Figure 5:
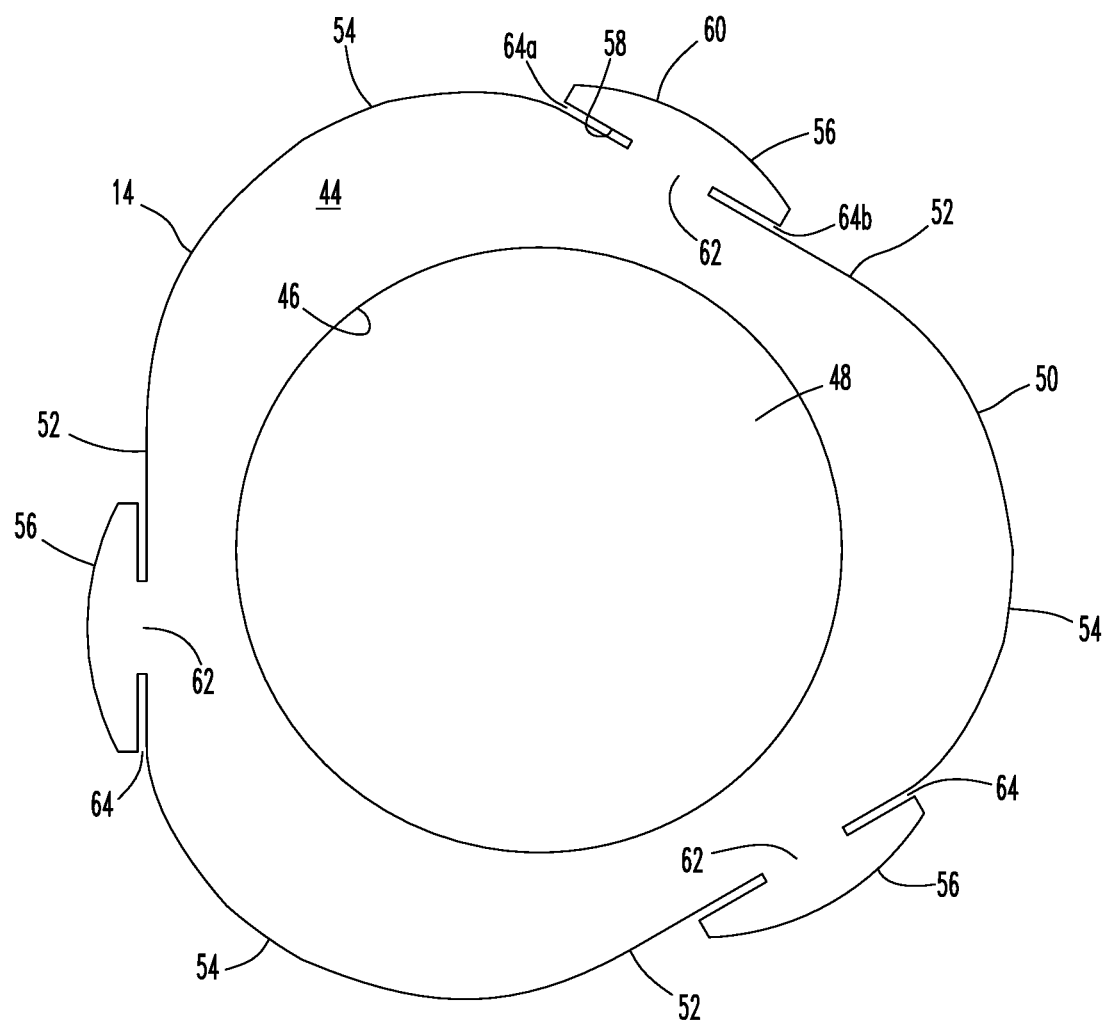
FIG. 5 illustrates a medial disk being one of the components shown in FIG. 1.

FIG. 5 illustrates the medial disk 14. The medial disk has a generally annular-shaped body 44 having an inner periphery 46 defining and surrounding a central orifice 48, and an outer periphery 50 spaced radially away from the inner periphery. By "substantially annular" is meant the inner periphery surrounds the central orifice and the outer periphery is spaced apart from and surrounds the inner periphery. The illustrated inner periphery 46 is circular-shaped while the outer periphery 50 is substantially circular-shaped but has three flattened portions 52 spaced around the outer periphery and disposed between circular portions 54 of the outer periphery.

Extending from each flattened portion 52 is a respective like tab 56. In the illustrated embodiment the tab is placed closer to one end of the flattened portion to place the tab closely adjacent to a curved portion 54 of the outer periphery 50.

The tab has a flat or straight lower side 58 spaced from and parallel with the adjacent flattened portion and a curved upper side 60. The tab is sized to closely pass through the longitudinal slot 32 of a longitudinal member 12.

Each tab 56 is joined to the adjacent flattened portion 52 of the body 44 by a respective rectangular neck 62 extending from the adjacent flattened portion to the lower side 58 of the tab. The neck is centered along the lower side of the tab and spaces the tab from the flattened portion by a distance slightly greater than the thickness of a longitudinal member 12. The neck divides the space between the flattened portion and the lower side of the tab into two open slots 64 including a slot 64a and a slot 64b separated by the neck. The neck is sized to be rotatably received when in the through hole 34 of a longitudinal member 12.

Figure 6:
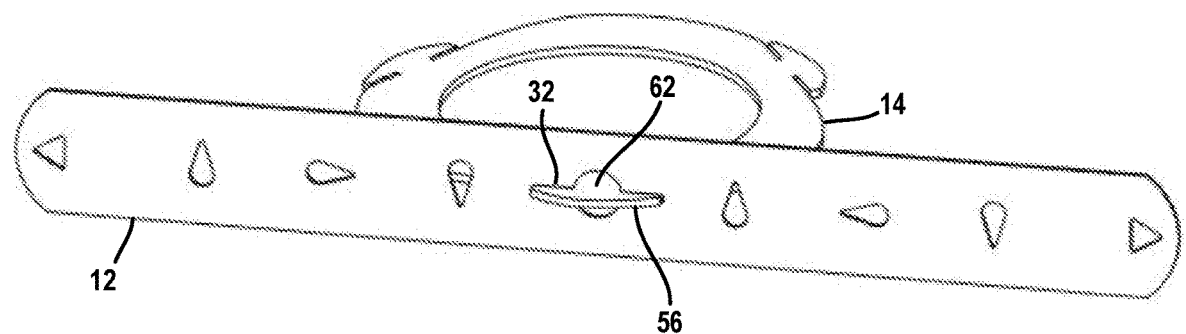
FIGS. 6 and 7 illustrate attaching a longitudinal member to the medial disk.
Figure 7:
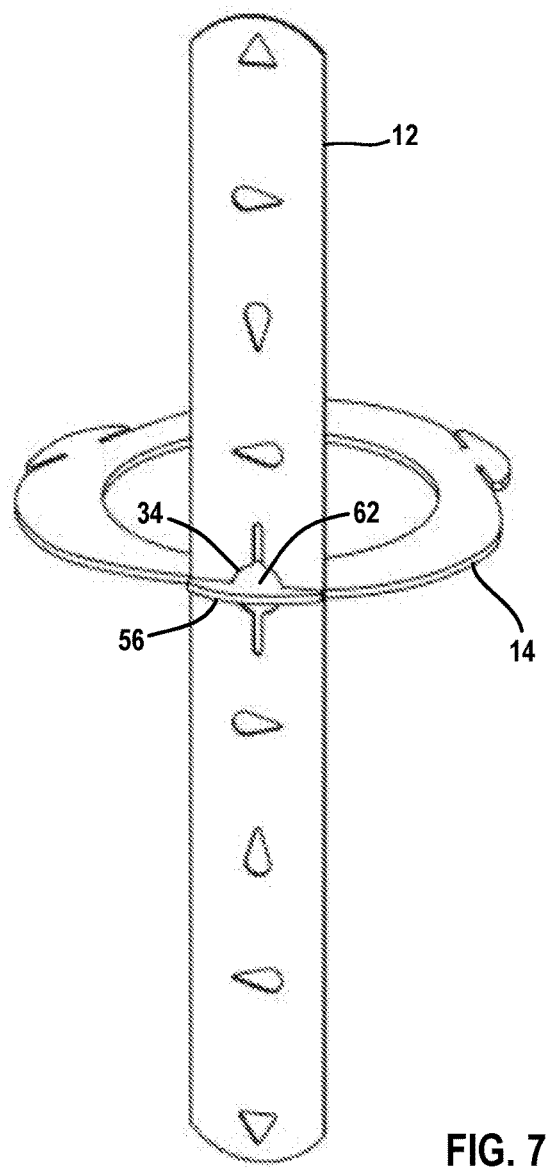
Figure 8:
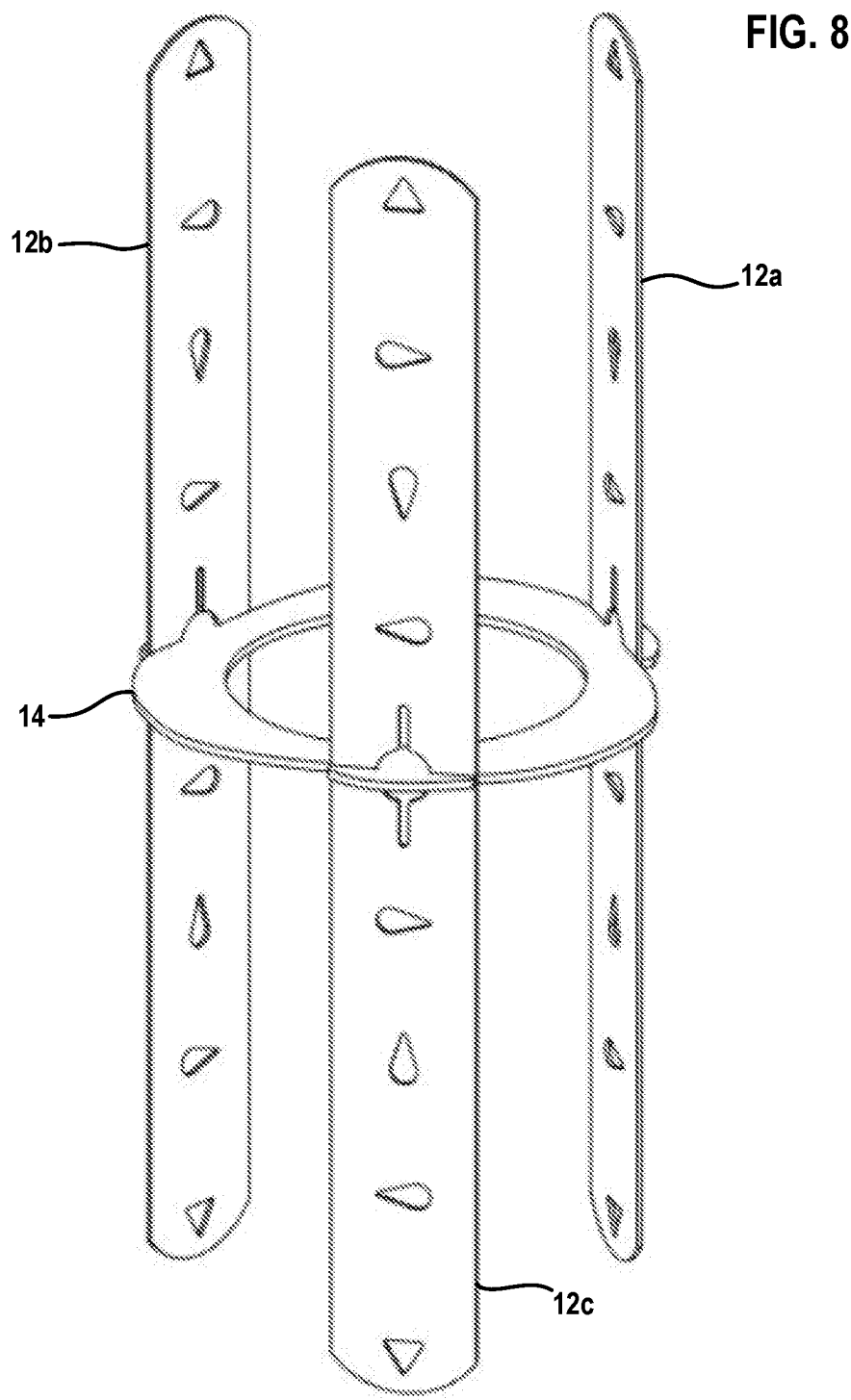
FIG. 8 illustrates the three longitudinal members of the surge suppressor attached to the medial disk.

FIGS. 6-8 illustrate attaching the longitudinal members 12a, 12b, 12c to the medial disk 14. A longitudinal member 12 is placed adjacent to a tab 56 with the member's longitudinal slot 32 aligned with and parallel to the tab. The tab 56 is inserted through the longitudinal slot 32 until the tab passes through the slot and the neck 62 is received in the through hole 34. See FIG. 6. The longitudinal member is then rotated about the neck to be transverse with the medial disk 14 and extend longitudinally closely between and along the lower side of the tab and the flattened portion of the outer periphery.

The tab 56 is now on the opposite side of the longitudinal member from the flattened portion 52 of the disk outer periphery 50 and transverse to the longitudinal slot 32 whereby the tab and neck attach the longitudinal member to the medial disk 14. See FIG. 7. This is then repeated with the other two longitudinal members to attach the spaced apart longitudinal members to and spaced around the medial disk. The illustrated medial disk 14 has three tabs 56 for the attachment of three longitudinal members 12.

Figure 14:
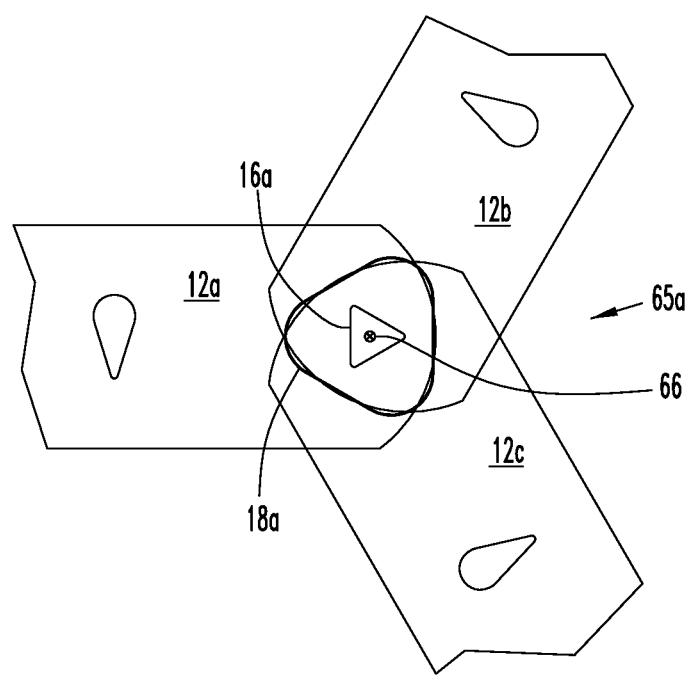
FIG. 14 is an end view of the pin shown in FIG. 13 further illustrating the pin and fastening washer joining the first ends of the longitudinal members shown in FIG. 13.
Figure 15:
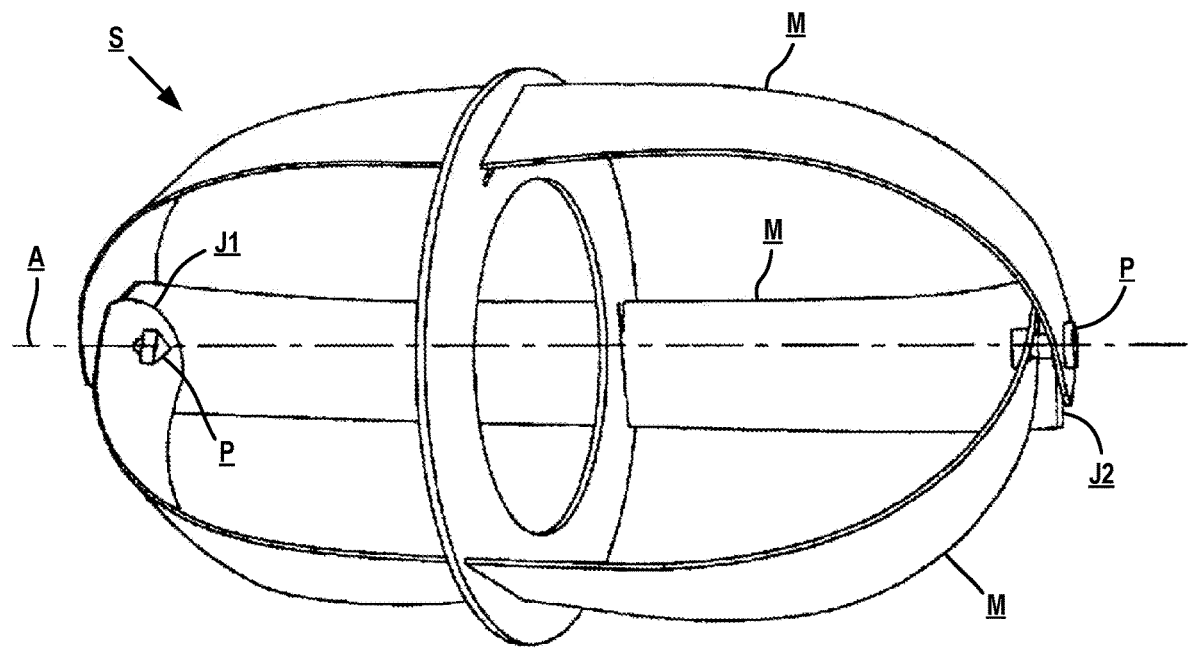
FIG. 15 illustrates a prior art medially stabilized surge suppressor.
Figure 16:
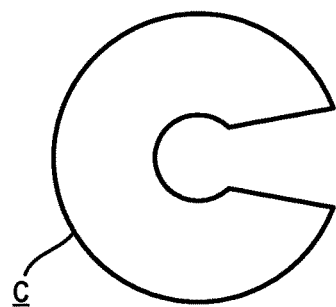
FIG. 16 is a top view of a prior art clip used to further secure the ends of the longitudinal members of the surge suppressor shown in FIG. 15.

FIG. 8 illustrates the three longitudinal members 12a, 12b, 12c attached to the medial disk 14 prior to joining together the first ends of the longitudinal members at a first junction 65a (see FIGS. 13 and 14) and the second ends of the longitudinal members at a like second junction, the junctions similar to the junctions J1 and J2 shown in FIG. 15.

Because the tabs 56 are not centered but are instead offset along the flattened portions 52 of the medial disk 14, the longitudinal members 12 are caused to be held by the tabs at an oblique angle with respect to the medial disk central axis when the first and second ends of the longitudinal members are joined together. This effectively recreates the oblique angle of the longitudinal members of the surge suppressor S, causing the surge suppressor to rotate when fluid strikes the oblique portions of the longitudinal members.

Figure 9:
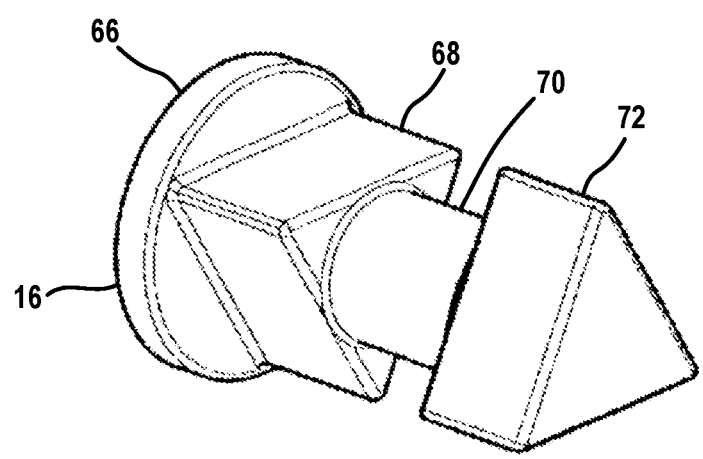
FIG. 9 illustrates one of the pins being one of the components shown in FIG. 1.
Figure 12:
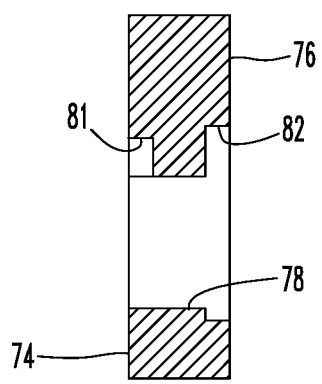
FIG. 12 is a sectional view taken along line 12-12 of FIG. 10.

The like fastening pins 16—that is, the pins 16a and 16b—are each identical to the fastening pin P shown in FIG. 15 and as shown in detail in FIG. 9. A pin 16 includes an enlarged base 66 at a first end of the pin, an equilateral triangle-shaped first lobe 68 adjacent the base, and a reduced width shaft portion 70 extending from the first lobe to a second equilateral triangle-shaped lobe 72 on the opposite second end of the pin. The first and second lobes are alike in shape but angularly offset with respect to one another.

The pin 16a passes through the first fastener openings 28 to join together the first ends 22 of the longitudinal members 12. The pin 16b passes through the second fastener openings 30 to join together the second ends 24 of the longitudinal member 12. The pins 16 pass through and join the first and second ends of the longitudinal member in the same way. Fastening the ends of the longitudinal members with the pins 16 are described in the '423 patent and so that will not be described in more detail.

Figure 10:
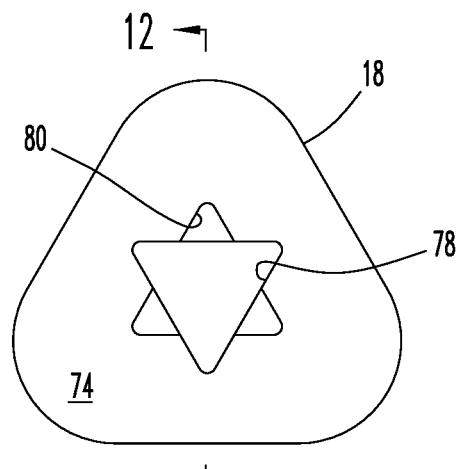
FIG. 10 is a top view of a fastening washer being one of the components shown in FIG. 1.
Figure 11:
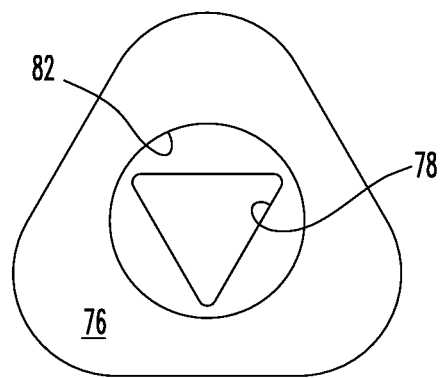
FIG. 11 is a bottom view of the fastening washer shown in FIG. 10.

FIGS. 9-11 illustrate a fastening washer 18 used to further secure the ends of the longitudinal members 12 joined by a fastening pin 16. The illustrated fastening washer is formed as a generally triangular flat plate having rounded corners and having a first side 74 and an opposite second side 76 separated by the thickness of the fastening washer. A central equilateral triangle-shaped through hole 78 extends through the thickness of the plate. The through hole 78 is sized to closely receive the pin's second lobe 72 with the outer perimeter of the fastening washer 18 surrounding and spaced relatively far from the second lobe.

The fastening washer 18 further includes an essentially equilateral triangle-shaped indention 80 formed on the first side of the plate and centered on the through hole 78. The indention 80 is the same shape of the through hole but is rotated degrees (half the angular displacement of symmetry of an equilateral triangle) with respect to the through hole 78. The indentation being located over the through hole 78 thereby forms three triangular flat-bottomed indentations 81 midway along the walls bounding the through wall 78.

The illustrated fastening washer 18 additionally includes a round indentation 82 formed on the second side 76 of the plate. The indention 82 is centered on and surrounds the fastening washer through hole 78.

Figure 13:
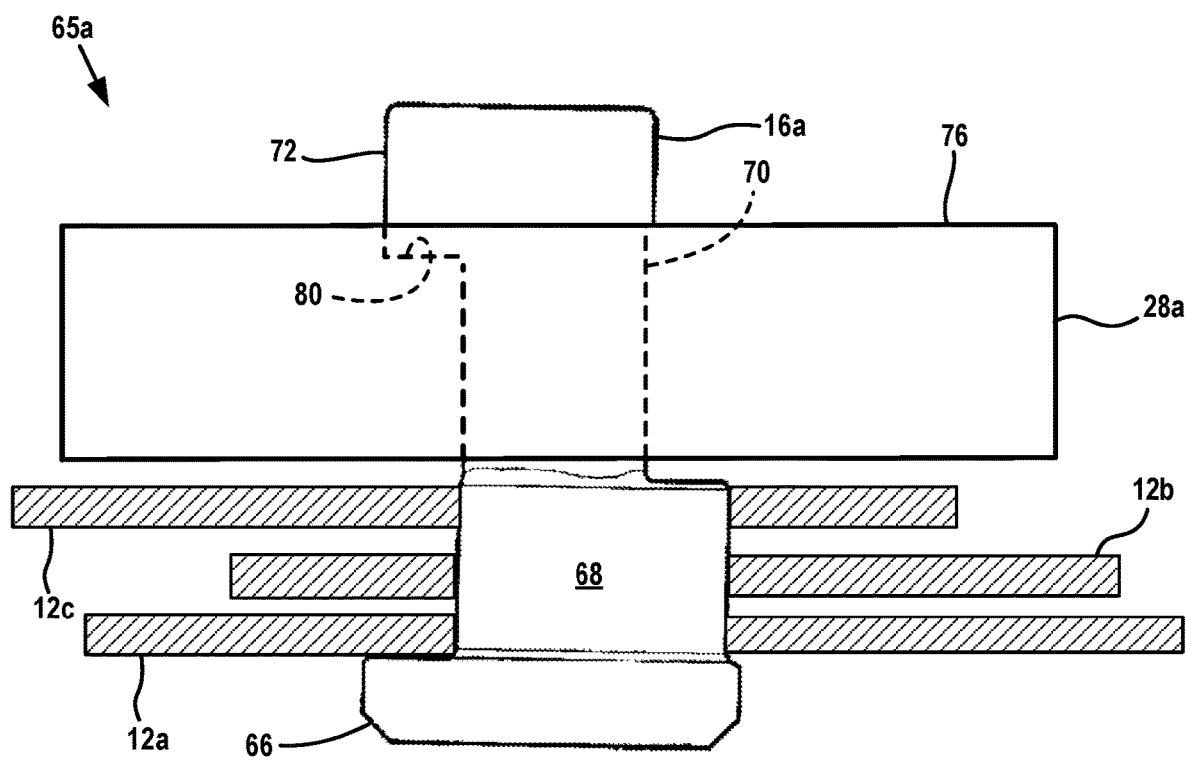
FIG. 13 illustrates the pin and fastening washer shown in FIGS. 9 and 10 respectively joining together first ends of the longitudinal members shown in FIG. 8.

FIG. 13 illustrates the junction 65a of the first ends of the longitudinal members 12a, 12b, 12c, with the pin 16a shown joining the first ends 22 and the fastening washer 18a on the pin 16a and securing the longitudinal members on the pin (it being understood the pin 16b and the fastening washer 18b join and secure the second ends 24 of the longitudinal members in lie manner). To simplify the drawing the first ends 22 are drawn in FIG. 13 as being substantially straight, it being understood the longitudinal first ends 22 are in a curved state as they begin extending from the fastening pin towards the medial disk 14.

The fastening washer 18a slides on the pin 16a via the through-hole 78 after the longitudinal members 12a, 12b, 12c are joined together by the pin. The fastening washer slides onto the second lobe 72 of the pin with the second side 76 of the fastening washer facing the base 66. The fastening washer is then pushed towards the base until the first lobe 68 is received in the lower washer indentation 82 and the second lobe clears the fastening washer. The fastening washer extends along the reduced shaft portion 70 of the pin and partially overlays the first lobe 68, the first lobe rotatably received in the lower washing indention.

The fastening washer 18a is then rotated 60 degrees about the reduced shaft portion 70 to align the upper washer indention with the second lobe 72. The fastening washer is then released, and the resilient first ends 22 of the longitudinal members 12a, 12b, 12c urge the fastening washer along the pin towards and against the second lobe. The outer facing edges of the indentation 80 can optionally be beveled to assist guiding the fastening washer into the indentation.

With the fastening washer 18a urged against the second lobe 72 and the indention 80 aligned with the second lobe, the second lobe 72 is received within the indention 80 whereby the fastening washer and the second lobe cooperatively form a nonrotatable connection between them that resists angular displacement of the fastening washer with respect to the pin 16a. The depth of the indention 80 into the fastening washer is selected to assure a reliable non-rotatable connection between the fastening washer and the second lobe. Any beveling of the indentation should be sized so as to not affect the reliable non-rotatable connection. Receipt of the second lobe into the fastening washer indentation can also be confirmed by visual inspection of the second end of the pin after assembly.

FIG. 14 illustrates the first junction 65a located on an axis 66 perpendicular to the drawing sheet and coaxial with the second junction. The fastening pin 16a and fastening washer 18a secure the first ends of the longitudinal members 12a, 12b, 12c on the pin 16a, it being understood the second ends of the longitudinal members are secured in like manner by the fastening pin 16b and fastening washer 18b at the axially opposite second junction to form the assembled surge suppressor. The fastening washer 18a is shown in the figure with a relatively heavy line weight to illustrate the orientation of the fastening washer with respect to the longitudinal members.

The vertices of the fastening washer 18a are aligned with and overlay the first ends of the longitudinal members 12a, 12b, 12c so that the longitudinal members reliably urge the fastening washer against the second lobe 72 for a reliable non-rotatable connection between the fastening washer and the second lobe during use of the surge suppressor.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art including (but not limited to) changes in material selection, size, operating ranges, environment of use, number and arrangement of longitudinal members, number, arrangement, orientation, and size and shape of longitudinal member flow orifices, use of different numbers, arrangements, orientations, sizes and shapes of flow orifices among the different longitudinal members (including eliminating flow orifices in one or more of the flow members), and the like, as well as such changes and alterations that fall within the purview of the following claims.

What is claimed is:

1. A surge suppressor comprising:
a plurality of longitudinal members, each longitudinal member being a flexible member and extending along a respective longitudinal axis of the longitudinal member, each longitudinal member comprising a first free end, a longitudinally opposite second free end, and an intermediate portion being disposed between the first and second free ends;
the first free ends of the plurality of longitudinal members being joined together at a first junction and the second free ends of the plurality of longitudinal members being joined together at a second junction spaced from the first junction along a central axis;
a generally planar medial disk lying in a transverse plane substantially perpendicular to the central axis, the medial disk being joined to the intermediate portion of each longitudinal member and defining a fixed relationship between the longitudinal members;
at least one of the longitudinal members comprising a plurality of longitudinally spaced apart flow orifices whereby when the surge suppressor is submerged in a fluid, fluid can flow through the flow orifices of the at least one longitudinal member as well as between the longitudinal members;
wherein at least one flow orifice of the plurality of flow orifices is configured to discharge a curved flow of fluid passing through the flow orifice; and
wherein the at least one flow orifice is teardrop shaped.

2. A surge suppressor comprising:
a plurality of longitudinal members, each longitudinal member being a flexible member and extending along a respective longitudinal axis of the longitudinal member, each longitudinal member comprising a first free end, a longitudinally opposite second free end, and an intermediate portion being disposed between the first and second free ends;
the first free ends of the plurality of longitudinal members being joined together at a first junction and the second free ends of the plurality of longitudinal members being joined together at a second junction spaced from the first junction along a central axis;
a generally planar medial disk lying in a transverse plane substantially perpendicular to the central axis, the medial disk being joined to the intermediate portion of each longitudinal member and defining a fixed relationship between the longitudinal members;
at least one of the longitudinal members comprising a plurality of longitudinally spaced apart flow orifices whereby when the surge suppressor is submerged in a fluid, fluid can flow through the flow orifices of the at least one longitudinal member as well as between the longitudinal members; and
wherein the at least one longitudinal member comprises a pair of fastener openings disposed on opposite ends of the longitudinal members and an elongate slot disposed between the fastener openings, the plurality of flow orifices comprising a first set of flow orifices between one of the pair of fastener openings and the slot and a second set of flow orifices between the other of the pair of fastener openings and the slot.

3. A surge suppressor comprising:
a plurality of longitudinal members, each longitudinal member being a flexible member and extending along a respective longitudinal axis, each longitudinal member comprising a first free end, a longitudinally opposite second free end, and an intermediate portion being disposed between the first and second free ends;
the first free ends of the plurality of longitudinal members being joined together at a first junction and the second free ends of the plurality of longitudinal members being joined together at a second junction spaced from the first junction along a central axis;
a generally planar medial disk lying in a transverse plane substantially perpendicular to the central axis, the medial disk being joined to the intermediate portion of each longitudinal member and defining a fixed relationship between the longitudinal members;
the medial disk comprising a generally annular-shaped body, a plurality of tabs, and a plurality of necks, the tabs attached to the body by the necks;

the annular-shaped body comprising an inner periphery and an outer periphery, the inner periphery surrounding an orifice, the central axis passing through the orifice, and the outer periphery spaced radially from the central axis a greater distance than the inner periphery;

the plurality of tabs being spaced apart around the outer periphery of the annular-shaped body, each tab being spaced from the outer periphery and being connected to the outer periphery by a respective neck of the plurality of necks, the neck being narrowed with respect to the tab and extending from the outer periphery to the tab;

each tab of the plurality of tabs having a maximum width dimension generally tangential with respect to the outer periphery, each neck of the plurality of necks having a narrowed width dimension generally tangential with respect to the outer periphery; and each longitudinal member comprising a longitudinal through-slot being disposed in the intermediate portion of the longitudinal member and a neck hole being disposed along the slot, a respective neck of the plurality of necks being disposed in the neck hole, the through-slot being sized to receive the maximum width dimension of a tab and the neck hole being sized to rotatably receive the neck but being sized to not receive the maximum width dimension of the tab, whereby the longitudinal member can be joined to the medial disk at a tab by passing the tab through the slot until the neck is within the neck hole and then rotating the longitudinal member with respect to the medial disk until the slot is generally transverse to the neck with the neck in the neck hole and the intermediate portion of the longitudinal member extending generally parallel with the central axis at the medial disk to resist separation of the longitudinal member away from the medial disk.

4. The surge suppressor of claim 3 wherein the outer periphery of the medial disk comprises alternating curved portions and flattened portions, each tab of the plurality of tabs extending from a respective flattened portion.

5. The surge suppressor of claim 4 wherein each tab of the plurality of tabs is disposed between a pair of curved portions of the outer periphery of the medial disk, the tab being disposed closer to one of the pair of curved portions than to the other of the pair of curved portions.

6. The surge suppressor of claim 4 wherein each tab of the plurality of tabs has a bottom side facing the adjacent flattened outer periphery of the medial disk, the neck attaching the tab to the medial disk being centered along the bottom side.

7. The surge suppressor of claim 6 wherein the bottom side of each tab of the plurality of tabs is straight and faces a respective flattened portion of the outer periphery of the medial disk.

8. The surge suppressor of claim 6 wherein the bottom side of each tab of the plurality of tabs cooperates with the adjacent flattened portion of the outer periphery of the medial disk to define a pair of open slots disposed on opposite sides of the neck being attached to the tab.

9. The surge suppressor of claim 3 wherein each tab of the plurality of tabs has a flat lower side facing the outer periphery of the medial disk and a curved upper side.

10. A surge suppressor comprising:
a plurality of longitudinal members, each longitudinal member being a flexible member and extending along a respective longitudinal axis, each longitudinal member comprising a first free end, a longitudinally opposite second free end, and an intermediate portion being disposed between the first and second free ends;

the first free ends of the plurality of longitudinal members being joined together at a first junction and the second free ends of the plurality of longitudinal members being joined together at a second junction spaced from the first junction along a central axis;

a generally planar medial disk lying in a transverse plane substantially perpendicular to the central axis, the medial disk being joined to the intermediate portion of each longitudinal member and defining a fixed relationship between the longitudinal members; and each of the first and second junctions comprising a respective fastening pin and a fastening washer that join together the longitudinal member end portions at the junction, the fastening pin extending through fastener openings formed in the longitudinal member end portions at the junction;

the respective fastening pin of each of the first and second junctions comprising opposed first and second ends, a base at the first end, a shaft extending from the base to the second end, the shaft comprising a first lobe adjacent the base, a second lobe disposed at the second end of the shaft, and a reduced dimension intermediate portion joining the first and second lobes, the base being configured to resist passage of the base through the fastener openings, the first and second lobes and the intermediate shaft being configured to be passable through the fastening openings;

the fastening washer of each of the first and second junctions being disposed on the respective fastening pin along the intermediate portion of the shaft between the second lobe and the free ends of the longitudinal members at the junction, the fastening washer comprising a first side facing the second lobe, a washer hole extending from the one side of the fastening washer through the fastening washer that receives the intermediate portion of the shaft, and an indentation being disposed on the one side of the fastening washer, the fastening washer being sized to not pass through the fastener openings of the longitudinal members, the fastening washer being movable along the intermediate portion of the shaft away from the second lobe to clear the second lobe, the fastening washer when clear of the second lobe being orientable about the intermediate portion of the shaft with respect to the second lobe in a first orientation and a different second orientation, the fastening washer when in the first orientation having the washer hole aligned with the second lobe that enables the second lobe to be received in the washer hole, the fastening washer when in the second orientation oriented with the second lobe whereby the second lobe cannot enter the washer hole, the fastening washer being in the second orientation with respect to the second lobe, and end portions of the longitudinal members urging the fastening washer against the second lobe, the indentation receiving a portion of the second lobe within the indentation wherein the fastening washer and the second lobe form a non-rotatable connection resisting angular displacement of the fastener washer away from the second orientation whereby the fastening pin captures the end portions of the longitudinal members between the fastening washer and the base of the fastening pin.

11. The surge suppressor of claim 10 wherein the washer hole and the washer indentation of each fastening washer are like polygon-shaped, the washer indentation overlying the washer hole.

12. The surge suppressor of claim 11 wherein the washer hole and the washer indentation of each fastening washer are like triangular-shaped.

13. The surge suppressor of claim 10 wherein for each fastening washer the washer hole and the indentation have like shapes, the indentation being angularly offset with respect to the washer hole.

14. The surge suppressor of claim 13 wherein for each fastening washer the washer hole and the indentation have like substantially regular polygon shapes, the indentation being angularly offset from the washer opening by half the angle of symmetry of the regular polygon.

15. The surge suppressor of claim 10 wherein each fastening washer comprises a second indentation on a second side of the fastening washer opposite the first side of the fastening washer, the second indentation being configured to rotatably receive the first lobe of the fastening pin carrying the fastening washer.

16. A surge suppressor comprising:
- a plurality of longitudinal members, each longitudinal member being a flexible member and extending along a respective longitudinal axis, each longitudinal member comprising a first free end, a longitudinally opposite second free end, and an intermediate portion being disposed between the first and second free ends;
- the first free ends of the plurality of longitudinal members being joined together at a first junction and the second free ends of the plurality of longitudinal members being joined together at a second junction spaced from the first junction along a central axis;
- a generally planar medial disk lying in a transverse plane substantially perpendicular to the central axis, the medial disk being joined to the intermediate portion of each longitudinal member and defining a fixed relationship between the longitudinal members;
- the medial disk comprising a generally annular-shaped body, a plurality of tabs, and a plurality of necks;
- the annular-shaped body comprising an inner periphery and an outer periphery, the inner periphery surrounding an orifice, the central axis passing through the orifice, and the outer periphery spaced radially from the central axis a greater distance than the inner periphery;
- the plurality of tabs being spaced apart around the outer periphery of the annular-shaped body, each tab being spaced from the outer periphery and being connected to the outer periphery by a respective neck of the plurality of necks extending from the outer periphery to the tab;
- each tab of the plurality of tabs having a maximum width dimension generally tangential with respect to the outer periphery, each neck of the plurality of necks having a narrowed width dimension generally tangential with respect to the outer periphery;
- each longitudinal member of the plurality of longitudinal members comprising a longitudinal through-slot being disposed in the intermediate portion of the longitudinal member and a neck hole being disposed along the slot, the slot being sized to receive the maximum width dimension of a tab and the neck hole being configured to rotatably receive the neck but being sized to not receive the maximum width dimension of the tab, whereby the longitudinal member can be joined to the medial disk at a tab by passing the tab through the slot until the neck is within the neck hole and then rotating the longitudinal member with respect to the medial disk with the neck in the neck hole until the slot is generally transverse to the neck with the neck in the neck hole and the intermediate portion of the longitudinal member being generally parallel with the central axis to resist separation of the longitudinal member away from the medial disk;
- at least one of the plurality of longitudinal members comprising a plurality of longitudinally spaced apart flow orifices whereby when the surge suppressor is submerged in a fluid, fluid can flow through the flow orifices of the at least one longitudinal member as well as between the plurality of longitudinal members;
- each of the first and second junctions comprising a respective fastening pin and a fastening washer that join together the longitudinal member end portions at the junction, the fastener pin extending through fastener openings formed in the longitudinal member end portions at the junction;
- the respective fastener pin of each of the first and second junctions comprising opposed first and second ends, a base at the first end, a shaft extending from the base to the second end, the shaft comprising a first lobe adjacent the base, a second lobe disposed at the second end of the shaft, and a reduced dimension intermediate portion joining the first and second lobes, the base being configured to resist passage of the base through the fastener openings, the first and second lobes and the intermediate shaft being configured to be passable through the fastening openings;
- the fastening washer of each of the first and second junctions being disposed on the respective fastening pin along the intermediate portion of the shaft between the second lobe and the free ends of the longitudinal members at the junction, the fastening washer comprising a first side facing the second lobe, a washer hole extending from the one side of the fastening washer through the fastening washer that receives the intermediate portion of the shaft, and an indentation being disposed on the one side of the fastening washer, the fastening washer being sized to not pass through the fastener openings of the longitudinal members, the fastening washer being movable along the intermediate portion of the shaft away from the second lobe to clear the second lobe, the fastening washer when clear of the second lobe being orientable about the intermediate portion of the shaft with respect to the second lobe in a first orientation and a different second orientation, the fastening washer when in the first orientation having the washer hole aligned with the second lobe and enabling the second lobe to pass through the washer hole, the fastening washer when in the second orientation oriented with the second lobe whereby the second lobe cannot enter the washer hole, the fastening washer being in the second orientation with respect to the second lobe, and end portions of the longitudinal members urging the fastener washer against the second lobe, the indentation receiving a portion of the second lobe within the indentation wherein the fastening washer and the second lobe form a non-rotatable connection resisting angular displacement of the fastening washer away from the second orientation whereby the fastening pin captures the end portions of the longitudinal members between the fastening washer and the base of the fastening pin.

* * * * *